(No Model.)

N. WASHBURN.
RAILWAY CAR WHEEL.

No. 356,906. Patented Feb. 1, 1887.

Witnesses.
S. N. Piper.
H. B. Torrey.

Inventor.
Nathan Washburn.
by R. H. Eddy att'y.

UNITED STATES PATENT OFFICE.

NATHAN WASHBURN, OF ALLSTON, MASSACHUSETTS.

RAILWAY-CAR WHEEL.

SPECIFICATION forming part of Letters Patent No. 356,906, dated February 1, 1887.

Application filed October 4, 1886. Serial No. 215,211. (No model.)

*To all whom it may concern:*

Be it known that I, NATHAN WASHBURN, of Allston, in the county of Suffolk, of the Commonwealth of Massachusetts, have invented a new and useful Improvement in Railway-Car Wheels; and I do hereby declare the same to be described in the following specification, and represented in the accompanying drawings, of which—

Figure 1:
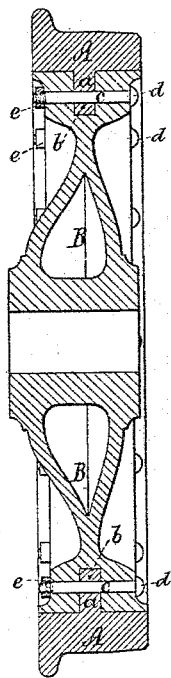
Figure 2:
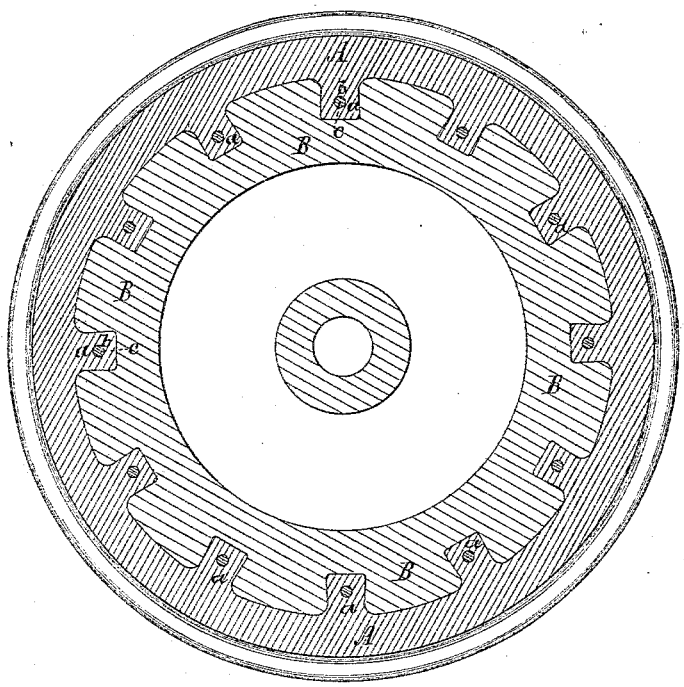

Figure 1 is a transverse and median section, and Fig. 2 a longitudinal section, of a car-wheel of my invention, the nature of which is defined in the claims hereinafter presented.

In this wheel the tire A, which is of steel, is provided with a series of ears, $a$, extending from its inner periphery at equal distances apart around such, each of such ears, by preference, being dovetailed in form, as represented, and having through it laterally a hole, $b$, to receive a screw-bolt, $c$, furnished at one end with a head, $d$, and being screw-threaded at the other end, and having screwed on it a nut, $e$.

The body B of the wheel is in one piece of metal cast within the tire and upon the shanks of the several bolts, after such bolts may have been suitably placed in the several ears.

Instead of the nuts screwed on the bolts, such bolts may be rivets, or formed without any screw-threads, and may extend beyond the body and be upset down upon it, or have washers put on them and afterward be upset or riveted down upon such washers; but for good reasons I prefer the screw-bolts and nuts to rivets or bolts upset, as stated.

In manufacturing the wheel, the tire, heated to a very high temperature and having one of the bolts arranged in each of the ears, is to be laid in the mold for founding the body, after which the cast-iron to form such body is to be run into the mold and against the inner periphery of the tire and about the ears and bolt-shanks, such being to weld or firmly unite the tire and its ears and bolts with the body.

In case of cracking or breaking of any part of the tire while the wheel may be in use, such part or those next adjacent to it will generally be held in place to great advantage by the ears and bolts thereof. The ears when dovetailed in form, as represented, will afford a stronger hold to the tire on the body and operate to prevent straining and rupture of the bolts.

I would observe that I am aware that it is not new to make a car-wheel with its steel tire provided with a continuous dovetailed rib extending from its inner periphery, the metallic body of the wheel being cast in one solid piece against the inner periphery of the tire and about the said rib, and there being a series of bolts going through the rim transversely, but not through the rib, all being as represented in an application for a patent recently made by me and allowed. I therefore do not herein claim such a construction of the wheel, as I have in my present wheel no continuous rib, but instead thereof a series of separate ears, and to each a bolt going through it laterally, each ear by preference being of a dovetailed form. Consequently,

I claim—

1. The improved railway-car wheel, substantially as described, consisting not only of a steel tire provided with a series of ears, each dovetailed in form and projecting from its inner periphery at or about at equal distances apart and with a bolt going through each of them laterally, but of an iron or metal body in one piece cast within and against such tire and about the ears and bolts, all as set forth.

2. A railway-car wheel composed not only of a steel tire provided with a series of ears projecting from its inner periphery at or about at equal distances apart and with a bolt going through each of them laterally, but of an iron or metallic body cast in one piece within and against such tire and about the ears and bolts, as specified.

NATHAN WASHBURN.

Witnesses:
R. H. EDDY,
R. B. TORREY.